US008028070B2

(12) United States Patent
Boyd et al.

(10) Patent No.: US 8,028,070 B2
(45) Date of Patent: Sep. 27, 2011

(54) SYNCHRONIZING TASKS BETWEEN SERVERS

(75) Inventors: Christopher Andrew Boyd, Seattle, WA (US); Boaz Lev, Redmond, WA (US); Robert Murugan, Sammamish, WA (US); Chythanya Vootkuri Krishna, Redmond, WA (US); Michael James Christensen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 189 days.

(21) Appl. No.: 12/467,534

(22) Filed: May 18, 2009

(65) Prior Publication Data

US 2010/0293278 A1 Nov. 18, 2010

(51) Int. Cl.
*G06F 15/173* (2006.01)
(52) U.S. Cl. ........ 709/226; 709/224; 709/231; 709/248; 370/315; 370/400; 705/14.51; 705/26.1
(58) Field of Classification Search .......... 709/204–207, 709/223–226
See application file for complete search history.

(56) References Cited

U.S. PATENT DOCUMENTS

| | | | | |
|---|---|---|---|---|
| 7,024,457 | B1 * | 4/2006 | Newman et al. | 709/206 |
| 7,027,808 | B2 * | 4/2006 | Wesby | 455/419 |
| 7,065,343 | B2 * | 6/2006 | Pelaez et al. | 455/412.2 |
| 7,437,739 | B1 | 10/2008 | Hsieh | |
| 7,451,163 | B2 | 11/2008 | Selman | |
| 7,493,367 | B1 * | 2/2009 | Newman et al. | 709/206 |
| 7,496,886 | B2 | 2/2009 | Puttaswamy | |
| 7,650,432 | B2 * | 1/2010 | Bosworth et al. | 709/248 |
| 2002/0065926 | A1 * | 5/2002 | Hackney et al. | 709/231 |
| 2004/0221323 | A1 * | 11/2004 | Watt | 725/135 |
| 2005/0222933 | A1 * | 10/2005 | Wesby | 705/36 |
| 2006/0070019 | A1 | 3/2006 | Vishnumurty | |
| 2006/0171420 | A1 * | 8/2006 | Chu et al. | 370/503 |
| 2007/0180075 | A1 * | 8/2007 | Chasman et al. | 709/223 |
| 2008/0209417 | A1 * | 8/2008 | Jakobson | 718/100 |
| 2008/0270547 | A1 * | 10/2008 | Glickstien et al. | 709/206 |
| 2009/0135836 | A1 * | 5/2009 | Veillette | 370/400 |
| 2009/0228509 | A1 * | 9/2009 | McCarthy et al. | 707/102 |
| 2009/0282125 | A1 * | 11/2009 | Jeide et al. | 709/217 |
| 2010/0131587 | A1 * | 5/2010 | Zenz et al. | 709/203 |

OTHER PUBLICATIONS

Outlook Plug-in Importing Tasks and Issues via Synchronization, (@task Community, 3 pages, posted on Sep. 2, 2008 at: https://community.attask.com/ docs/outlook_plug-in_importing_tasks_and_issues_via_synchronization).*
"EasyTaskSync (MS Project Outlook Sync) —5.7," Download 32, © 1996-2009, 2 pages.
"Kentico Server Sync —Summary," Kentico Software, Component Source®, © 1996-2009, 1 page.

(Continued)

*Primary Examiner* — Wing Chan
*Assistant Examiner* — Razu Miah
(74) *Attorney, Agent, or Firm* — Merchant & Gould P.C.

(57) ABSTRACT

Systems and methods for synchronizing task data between a mailbox server of an email system and a project server of a project management system include a project that is published on the project management system, task data for the project is sent from the project server to the mailbox server. The task data includes the attributes of the project tasks and resources assigned to the project tasks. When the mailbox server receives the task data, the mailbox server creates a task on the mailbox server for each task for which the task doesn't already exist on the mailbox server. The mailbox server inserts each created task into the mailbox of the assignee for the task. The assignee can view the task attributes and update task status using a client that accesses the mailbox server.

17 Claims, 5 Drawing Sheets

OTHER PUBLICATIONS

"Outlook Plug-in Importing Tasks and Issues via Synchronization," @task Community, 3 pages, posted on Sep. 2, 2008 at: https://community.attask.com/docs/Outlook_ Plug-in_Importing_Tasks_and_Issues_via_Synchronization.

"Siebel Server Sync for Microsoft Exchange Server," ORACLE®, © 2005, 2006, 4 pages.

"XC Bridge Bridging the Gap between Computer Systems," Xchange Network, © 2002-2008, 4 pages.

* cited by examiner

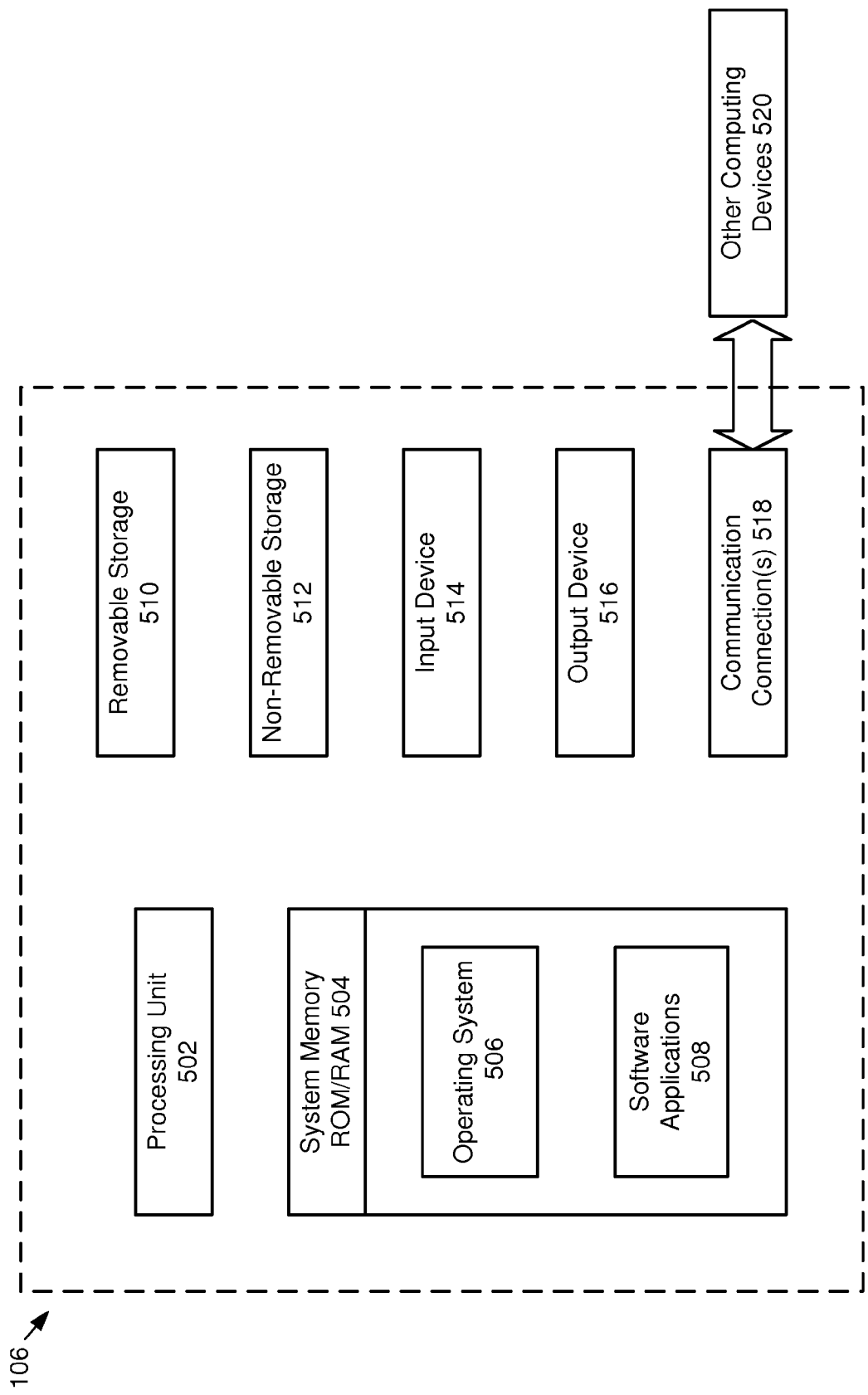

SYNCHRONIZING TASKS BETWEEN SERVERS

BACKGROUND

Project management systems assist project managers in developing project plans, assigning resources to tasks, tracking progress, managing budgets and analyzing workloads. Users of project management systems can typically view tasks assigned to them via a user interface and update task status. The project management systems permit users to view and update assigned tasks as the users work on and complete the tasks.

SUMMARY

Embodiments of the disclosure are directed to systems and methods for synchronizing project task information between a first server computer and a second server computer. An example method includes publishing a project on the first server computer, the first server computer implementing a project management software program, the project comprising one or more tasks, each of the one or more tasks including one or more attributes. After the project is published, the method includes mapping attributes for at least one of the one or more project tasks to corresponding task attributes used on a mail server program on the second server computer, the task attributes used on the mail server program being a subset of the project task attributes. After mapping task attributes for at least one of the one or more project tasks to corresponding task attributes used on a mail server program on the second server computer, the method includes sending the mapped task attributes for at least one of the one or more project tasks to the second server computer. The method also includes receiving a notification from the second server computer that a project task has been updated on the second server computer, and, after receiving a notification from the second server computer that a project task has been updated on the second server computer, sending a request to the second server computer for the task attributes of the project task that has been updated on the second server computer. After sending a request to the second server computer for the task attributes of the project task that has been updated, the method includes receiving the task attributes of the project task that has been updated from the second server computer. The method also includes, after receiving the task attributes of the project task that has been updated from the second server computer, determining whether the received task attributes of the project task are newer than task attributes for the project task stored on the first server computer, and, when a determination is made that the received task attributes for the project task are newer than the task attributes for the project task stored on the first server computer, replacing the task attributes of the project task stored on the first server computer with the received task attributes.

The details of one or more techniques are set forth in the accompanying drawings and the description below. Other features, objects, and advantages of these techniques will be apparent from the description, drawings, and claims.

DESCRIPTION OF THE DRAWINGS

FIG. 5 shows example components of the project server of FIG. 2.

DETAILED DESCRIPTION

The present application is directed to systems and methods for synchronizing task data between a mailbox server of an email system and a project server of a project management system. When a project is published on the project management system, task data for the project is sent from the project server to the mailbox server. The task data includes the attributes of the project tasks and resources assigned to the project tasks.

When the mailbox server receives the task data, the mailbox server creates a task on the mailbox server for each task for which the task doesn't already exist on the mailbox server. The mailbox server inserts each created task into the mailbox of the assignee for the task. The assignee can view the task attributes and update task status using a client that accesses the mailbox server.

When status for a task is updated on the email system, the mailbox server notifies the project server that the task has been updated. The project server obtains the attributes of the updated task and compares the attributes with task attributes stored on the project management system. When the attributes of the updated task are newer than the task attributes stored on the project management system, the task attributes stored on the project management system are replaced with the updated task attributes.

The project management system also permits a user of the project management system to update task status. Updating task status comprises updating one or more attributes for a task. When task status is updated by a user of the project management system, the updated attributes for the task are sent from the project server to the mailbox server. The attributes for the task on the mailbox server are then replaced with the updated attributes.

Figure 1:
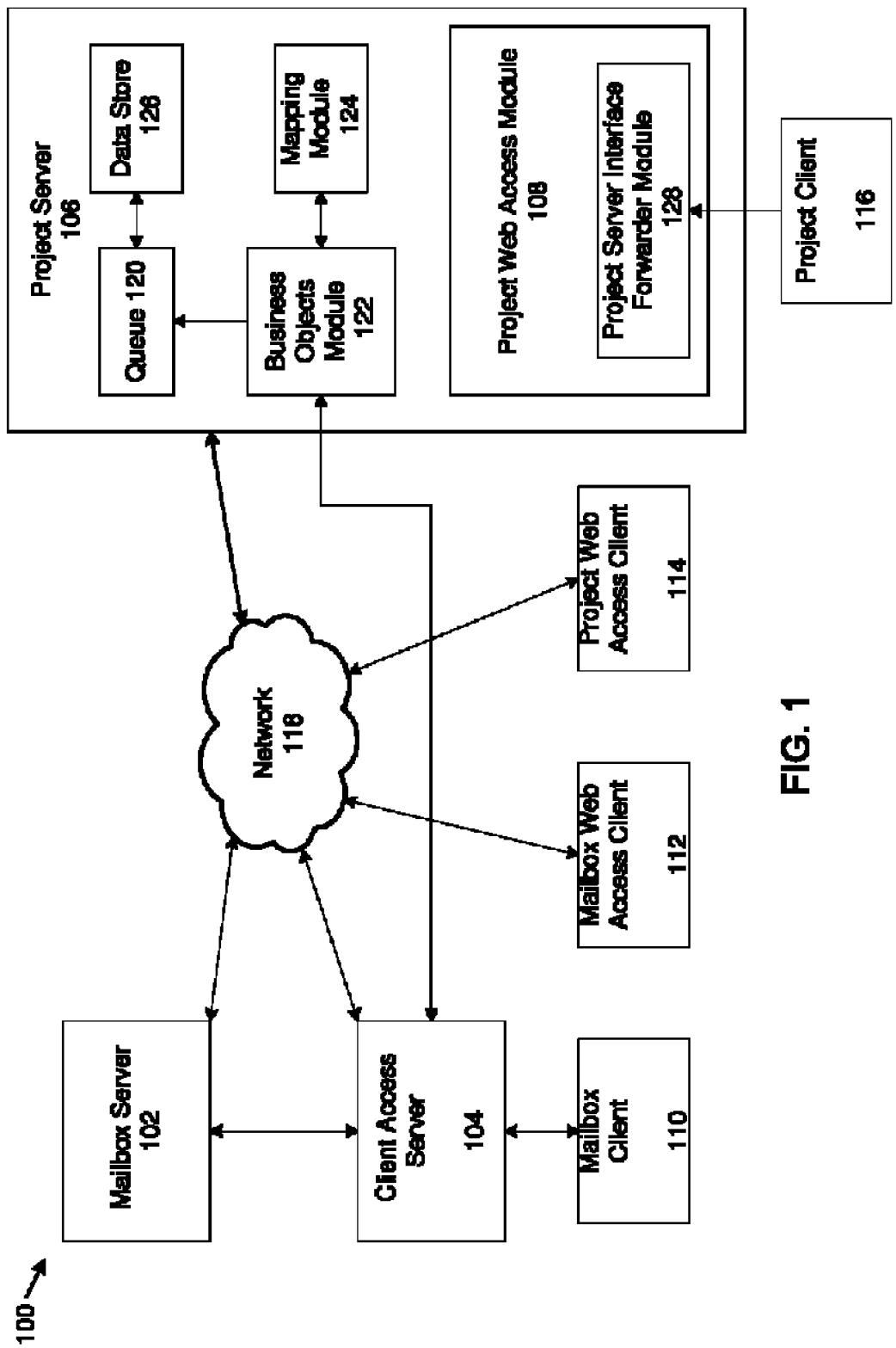
FIG. 1 shows an example system for synchronizing tasks between a project server and a mailbox server.

FIG. 1 shows an example system 100 that supports synchronizing task data between email system mailbox servers and project management system project servers. The system 100 includes mailbox server 102, client access server 104, project server 106, clients 110, 112, 114, 116 and a network 118. More or fewer clients and servers can be used. In this disclosure, the terms client and client computer are used interchangeably, and the terms server and server computer are used interchangeably.

Among the plurality of information stored on the clients 110, 112, 114, 116 is a client operating system ("OS") and client applications. The client OS is a program that manages the hardware and software resources of the client system. The client applications utilize the resources of the clients 110, 112, 114, 116 to directly perform tasks specified by the user. For example, the clients 110, 112 include one or more software applications, such as email programs, that are used to create, send and receive email messages and that have other functionality including creating and managing tasks. One example of such an application is the OUTLOOK® messaging and collaboration client from Microsoft Corporation of Redmond, Wash. As another example, client 114 includes a software application that is used to access and update project management information, such as Microsoft Office Project Web Access, also from Microsoft Corporation of Redmond, Wash. As a further example, client 116 includes a software application that is used implement a project management system, such as Microsoft Office Project Professional 2007, also from Microsoft Corporation of Redmond, Wash. Other examples of such software applications are also applicable.

Servers 102, 104, 106 are accessible through a network. Server 102 is a mailbox server, such as Microsoft Exchange Server 2007 from Microsoft Corporation of Redmond, Wash. Server 104 is a client access server that provides a cached version of a user mailbox from mailbox server 102. Servers 102 and 104 can be part of a cluster of server computers known as an email server farm. A server farm is maintained by a business enterprise to accomplish server needs beyond the capability of one server.

Server 106 is a server that implements project management system software, such as Microsoft Project Server 2007 from Microsoft Corporation of Redmond, Wash. In example embodiments, server 106 can be located within an organization or can be part of a system of shared services. An example system of shared services is a SHAREPOINT® team services portal server service provided by Microsoft Corporation. Server 106 can be part of a cluster of SHAREPOINT® portals known as a SHAREPOINT® farm.

The example project server 106 includes a queue 120, a business objects module 122, a mapping module 124, a data store 126 and a project web access module 108.

The project server 106 allows users to create and publish projects. A project is created using a project management software program, such as Microsoft Office Project Professional 2007 by Microsoft Corporation. The project is designed to assist individuals in developing plans, tracking progress, managing budgets and analyzing workloads. As part of the project creation process, the user can assign resources to tasks. Each task defines a discrete part of the project that is assigned to the relevant resource.

When a project is published on project server 106, a queue job for sending task data to mailbox server 106 is pushed onto example queue 120. A queue job is created for each resource that is assigned project tasks. Each queue job provides information to identify the resource, the published project tasks assigned to the resource and the attributes for each task. A queue job for sending task data to mailbox server 102 is also pushed onto example queue 120 when a task is updated on project server 106. The task data is typically in the form of a task object which represents an instantiation of the task.

The use of queue 120 permits task data to be synchronized between mailbox server 102 and project server 106 in an asynchronous manner. This is done for performance reasons. Communication with an email system can be intermittent over a network. The use of queue 120 permits project server 106 operations to proceed without being slowed down waiting for a response from mailbox server 102.

When a queue job to send task data to mailbox server 106 rises to the top of queue 120, the queue job is popped off of queue 120 and the queue job is processed. The processing of the published tasks queue jobs results in tasks being created on mailbox server 106 for all the tasks in the published project. There is typically a one-to-one mapping between project tasks assigned to a resource and tasks created on mailbox server 106 for the resource.

The example business objects module 122 includes business objects that implement the functionality of project server 106. This includes creating and publishing a task, processing status for a task, assigning resources to a task and interfacing with queue 120, client access server 104 and project web access server 108.

The example mapping module 124 maps task attributes for tasks stored on project server 106 to corresponding task attributes for tasks stored on mailbox server 102. Tasks created on project server 106 typically have more attributes than corresponding tasks stored on mailbox server 102. Therefore, only a subset of project server 106 task attributes are mapped to corresponding attributes on mailbox server 102.

The mapped task attributes are viewable via a client access program such as the OUTLOOK® messaging and collaboration client from Microsoft Corporation of Redmond, Wash. In one example, the mapped task attributes include subject, start date, due date, percent complete, actual work (in hours) and total work (in hours). Total work represents an estimate of the time needed to complete the task. Actual work represents the amount of work actually completed.

The example data store 126 stores project task data. Project task data includes an identifier for a task and task attributes. Example task attributes stored in the data store 126 include subject, start date, due date, actual work, percent complete. The data store 126 can either be on project server 106 or on a data store external to project server 106. The data store 126 also includes assignment data representing individuals assigned to tasks. An individual assigned to a task is known as a resource. The mapping between a task and a resource is known as an assignment.

The example project web access module 108 provides a web portal for client access to project server data. Project server 108 has a web page associated with it. The project web access module 108 makes the web page accessible to users. A user, for example a user on client 114, can access the project server 108 web page via a browser on client 114. The user can view assigned projects and tasks from the browser. The user can also update task attributes from the browser.

The project web access module 108 also includes example project server interface module 128. The example project server interface module 128 provides web access to a client, for example client 116, running a client-based project management program such as Microsoft Office Project Professional 2007. The example project server interface module 128 permits a program manager on the client-based project management program to view and update project tasks via project web access module 108.

The example mailbox server 102 uses folders to organize task information. A set of folders are created for each mailbox user that has assigned project tasks. Folders are organized by project server web site and project name. Each project server has a web site associated with it and a top level folder corresponds to the project web site. The Uniform Resource Locator ("URL") for the web site is typically used as part of the top level folder name. In addition, each project web site folder includes subfolders for each project on the project web site for which the mailbox user has assigned tasks. There is typically one folder for each assigned project. Each project folder includes the project tasks assigned to the mailbox user.

Client access server 104 provides a cached version of mailbox server 102. When an email system user, for example a user on mailbox client 110, connects to client access server 104 using an email client such as the OUTLOOK® messaging and collaboration client, the task assignments for the user are displayed in the user's project task mailbox folder. The user is then able to update status for the tasks.

Figure 2:
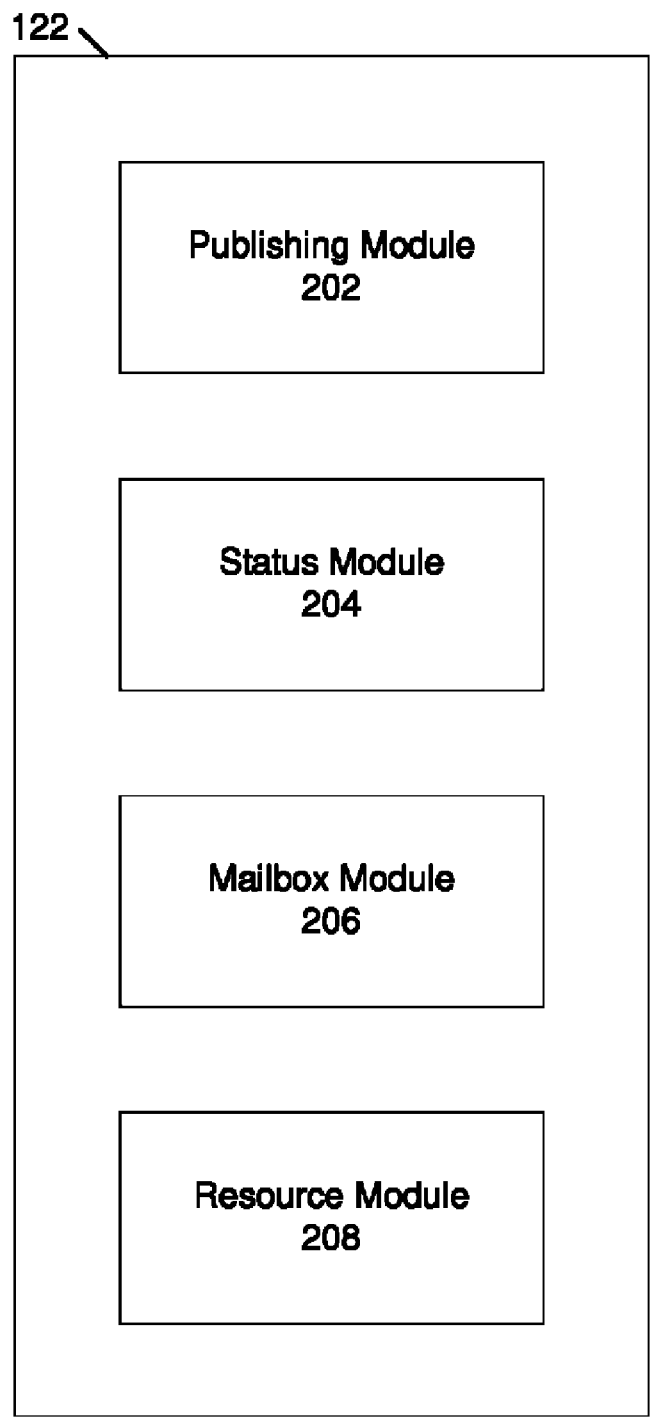
FIG. 2 shows example modules of an example project server of FIG. 1.

FIG. 2 shows a detailed view of the logical modules of example business objects module 122. Business objects module 122 includes a publishing module 202, a statusing module 204, a mailbox module 206 and a resource module 208.

The example publishing module 202 processes the publishing of a project on project server 106. A project is created by a project manager. The project includes tasks and resources assigned to tasks.

When all project information is entered, the project manager publishes the project. Publishing the project makes project information available online so that the project manager and the users assigned to project tasks can view and update project assignments over the Internet.

When a project is published, the example publishing module 202 creates a queue job to send project task data to mailbox server 102. A separate queue job is created for each resource in the project. The queue job includes information to locate task data for the resource in example data store 126 and to send the task data to mailbox server 102. Each queue job is pushed to queue 120.

In addition to creating a queue job for each project resource, the example publishing module 202 uses the example mapping module 124 to map attributes for each task to corresponding attributes for tasks used on mailbox server 102. Tasks created on project server 106 have more task attributes than email tasks provided on mailbox server 102, so only a subset of project server 106 tasks are mapped.

When a queue job to create a task on mailbox server 102 rises to the top of queue 120, the queue job is popped off the queue and executed. When the queue job is executed, the tasks for which the queue job was created to handle are created in the mailbox folder for the assignee of the task on mailbox server 102. In addition, each task is registered on mailbox server 102. Registering a task ensures that, when the task is updated on mailbox server 102, project server 106 receives notification of the update. The queue job rises to the top of queue 102 as a result of other queue jobs on queue 102 being executed. The queue job uses web services and an application programming interface (API) on mailbox server 102 to create and register the task on mailbox server 102. The API exposes methods on the mailbox server that are called by project server 106 when the queue jobs executes.

The example statusing module 204 processes status updates to tasks on project server 106. The status updates can be made via the example project web access module 108, for example by a user on example project web access client 114, by a user on example client 116 via example project server interface module 128 or by a project manager. Example client 116 runs a client-based project management program such as Microsoft Office Project Professional 2007. When a user updates task status, the attributes for the task are mapped to corresponding task attributes on mailbox server 102 and a queue job is pushed to queue 102 to update mailbox server 102 with the updated task status. The queue job includes the task status information and a timestamp indicating when the task was last updated. In addition, the queue job includes information to identify the task on mailbox server 102 and on project server 106.

When the queue job is popped off the queue and executed, the task update information is sent to mailbox server 102. The queue job uses web services and an application programming interface on mailbox server 102 to update the task on mailbox server 102.

The example mailbox module 206 processes task updates that originate from example client access server 104. When a task assignee, for example an assignee on mailbox client 110 updates status for an assigned task, the example mailbox module 206 receives a notification of the task update from the client access server 104. Each notification of a task update includes information to locate the task on project server 106.

When the mailbox module 206 receives a notification, the mailbox module 206 pushes a queue job to queue 102 to obtain updated task status for the task. When the queue job rises to the top of queue 102 and executes, project server 106 obtains the updated task information, including the attributes that have been updated for the task. Project server 106 also obtains a timestamp for the task. The updated attributes and timestamp for the task are obtained from client access server 104 via API calls using web services. Client access server 104 obtains the updated attributes and timestamp for the task from mailbox server 102.

When project server 106 receives the updated task information, project server 106 locates the task in a data store 126 on the project management system. The data store 126 can either be on project server 106 or on a data store external to project server 106. Project server 106 compares the updated task attributes with the task attributes in the data store 126. When the updated task attributes are newer than the task attributes for the task in the data store 126, the task attributes for the task in the data store 126 are replaced with the updated task attributes. The replacement of the task attributes with the updated task attributes is typically subject to business rules on project server 106. When an updated task attribute violates a business rule, the task attribute is changed so that the business rule is not violated. When a task attribute is changed because of a violation of a business rule, the changed task attribute is sent to client access server 104 so that mailbox server 102 is synchronized with project server 106.

The example resource module 208 identifies resources assigned to tasks. A resource is an individual who is assigned to perform a task. A resource may be assigned more than one task. When a task is created in mailbox server 102, the task is created in the mailbox folder of the task assignee.

Figure 3:
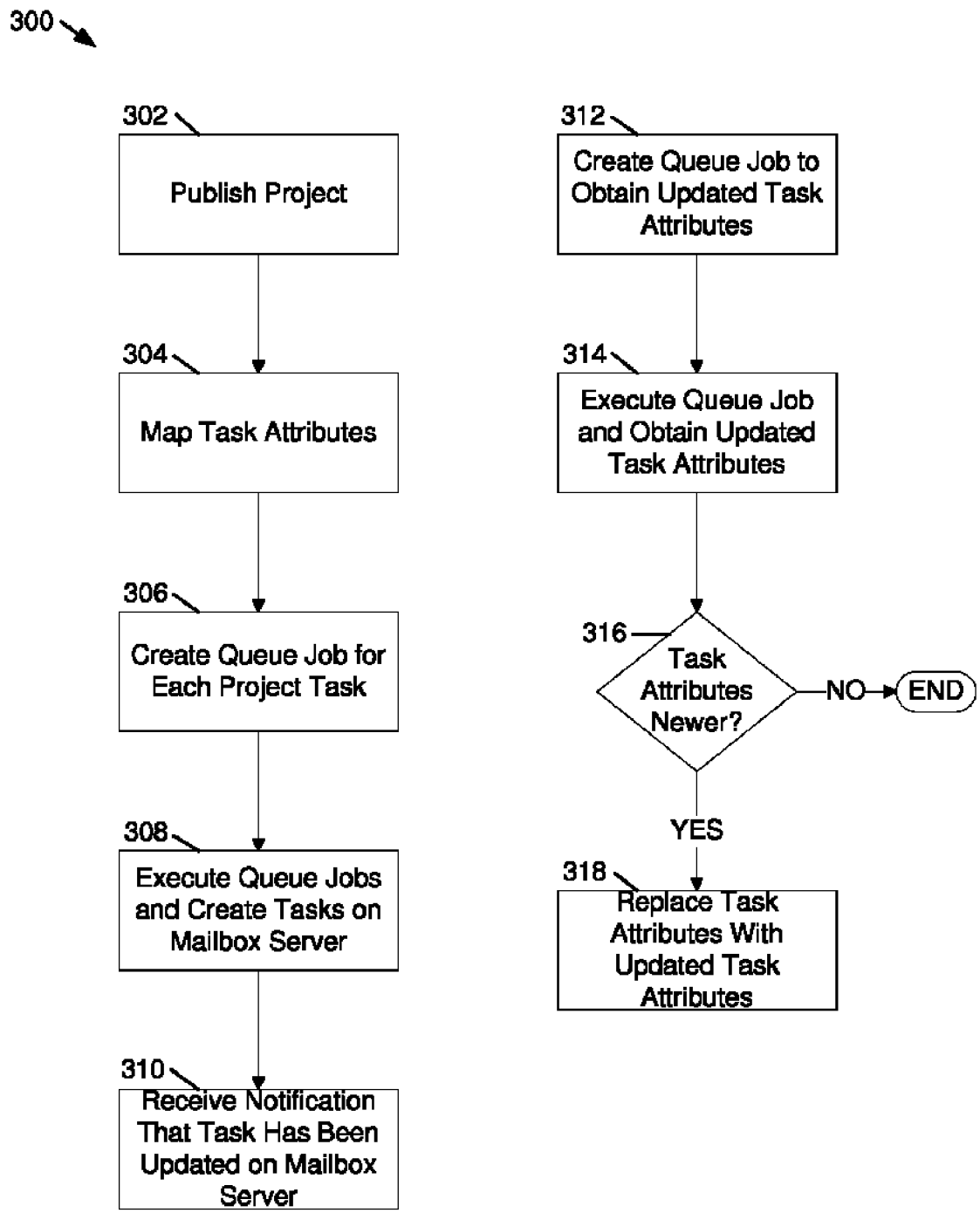
FIG. 3 shows a flowchart of a method for synchronizing tasks between a project server and a mailbox server as a result of publishing a project on the project server.

FIG. 3 shows a flowchart of example operation 300 for synchronizing task information between a project server 106 and mailbox server 102 when a project is published on project server 106. At operation 302, the example publishing module 202 publishes a project on project server 106. The project includes one or more tasks, each task having one or more attributes. Publishing the project makes the project accessible to users of a client based project access program such as Microsoft Office Project Web Access.

At operation 304, the example mapping module 124 maps project server task attributes for each task to corresponding task attributes used on mailbox server 106. The mapped attributes correspond to attributes available via a mailbox client such as Microsoft Outlook. The mapped task attributes include subject, start date, due date, percent complete, actual work and total work.

At operation 306, the project module 202 creates a queue job for each project resource and pushes each job queue onto queue 120. The queue job represents an operation to be performed at project server 106. In this example, the operation is to create the mapped project task for the queue job on mailbox server 102. The queue job includes information needed to locate the project task on the project server 106 data store 126.

At operation 308, a queue job for a project resource is executed and one or more project tasks for the project resource are created on mailbox server 102. The queue job is executed when the queue job rises to the top of queue 102 and is popped off queue 102. When the queue job is executed project server 106 uses web services to access API methods exposed by mailbox server 102. The API methods are used to create mailbox folders for the project resource, including subfolders for the project web site and for the projects assigned to the resource. In addition, API methods are used to register to each task at mailbox server 102 for notification at project server 106. Registering a task for notification results in project server 106 being notified when task status changes. A queue job is executed in this manner for each published project task.

A task assignee can view and update task status. When the task assignee updates task status, at operation 310 client access server 104 sends a notification to example mailbox module 206 that a mailbox task has been updated. The client access server 104 provides a cached copy of mailbox server 102 to a mailbox client, for example mailbox client 110.

When mailbox module 206 receives the notification, at operation 312, mailbox module 206 creates a queue job to obtain task attributes for the updated task. The queue job is pushed onto queue 102.

At operation 314, the queue job is executed and the attributes for the updated task are obtained from mailbox server 102. The attributes are obtained using API calls to mailbox 102 via web services.

At operation 316, a determination is made whether the attributes for the updated task are newer than the attributes for the task stored on data store 126. The determination is made, in part, by comparing a timestamp for the updated attributes with a timestamp for the attributes stored on data store 126. When it is determined that the attributes for the updated task are newer than the attributes for the task stored on data store 126, at operation 318 the attributes for the task stored on data store 126 are replaced with the attributes for the updated task, subject to business rules. This synchronizes task data between mailbox server 102 and project server 106.

Figure 4:
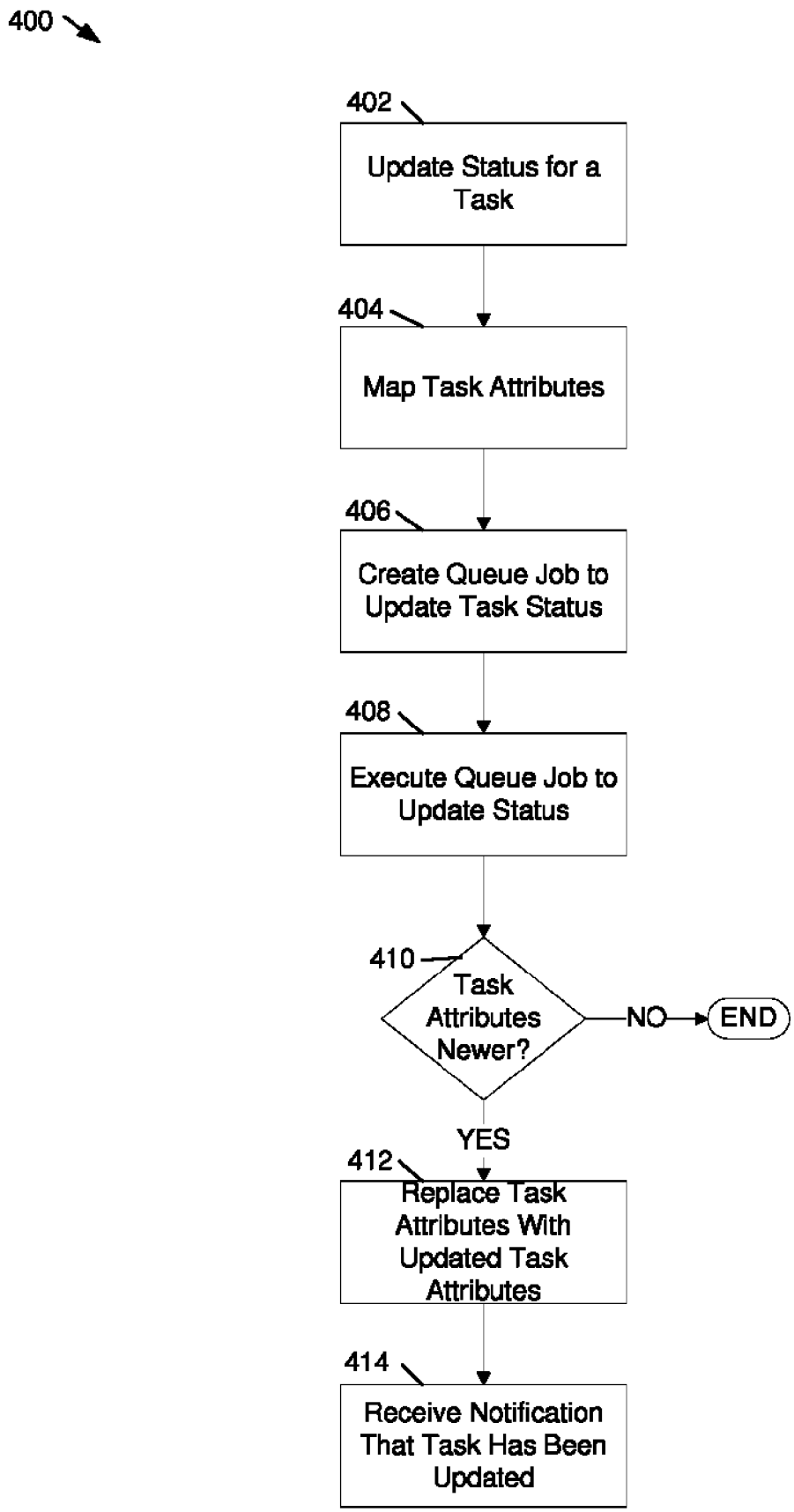
FIG. 4 shows a flowchart of a method for synchronizing tasks between a project server and a mailbox server as a result of updating task status on the project server.

FIG. 4 shows a flowchart of example operation 400 for synchronizing task information between a project server 106 and mailbox server 102 when status for a task is updated on project server 106. At operation 402, the example status module 204 processes a task status update on project server 106. The task status may be updated via example project web access module 108 by a task assignee, for example a user on project web access client 114. The task may also be updated by a project manager for project server 106 or by a client using a PC based project management system such as Microsoft Office Project Professional 2007. A client using a PC based project management system such as Microsoft Office Project Professional 2007 or using a third party application obtains access to the task on project server 106 via project interface service forwarder module 128.

At operation 404, the example mapping module 124 maps the attributes for the task to corresponding task attributes used on mailbox server 106. The mapped attributes correspond to attributes available via a mailbox client such as Microsoft Outlook. The mapped task attributes include subject, start date, due date, percent complete, actual work and total work.

At operation 406, the status module 204 creates a queue job to update status for the task on mailbox server 102. The status module 204 pushes the queue job onto queue 120. At operation 408, the queue job is popped off queue 120 and executed. As a result of executing the queue job, project server 106 sends the attributes for the task to mailbox server 102. Project server 106 sends the attributes for the task to mailbox server 102 using API methods exposed on mailbox server 102 via web services.

At operation 410, in example embodiments, a determination is made at mailbox server 102 whether the task attributes obtained from project server 106 are newer than the task attributes for the task stored on mailbox server 102. The determination is made, in part, by comparing a timestamp for the task attributes received from project server 106 with a timestamp for the task attributes stored on mailbox server 102. When a determination is made that the attributes for the task obtained from project server 106 are newer than the attributes for the task stored on mailbox server 102, at operation 412 the attributes for the task stored on mailbox server 102 are replaced with the attributes for the task obtained from project server 106. At operation 414, project server 106 receives a notification from client access server 104 that task data has been updated on mailbox server 102. As a result of the notification, project server 106 performs additional processing and verifies that task data is synchronized between mailbox server 102 and project server 106.

With reference to FIG. 5, example components of server 106 are shown. Servers 102, 104, and clients 110, 112, 114, 116 are configured in a similar manner.

In example embodiments, the server 106 is a computing device, such as a server computer. The server 106 can include input/output devices, a central processing unit ("CPU"), a data storage device, and a network device.

In a basic configuration, the computing device 106 typically includes at least one processing unit 502 and system memory 504. Depending on the exact configuration and type of computing device, the system memory 504 may be volatile (such as RAM), non-volatile (such as ROM, flash memory, etc.) or some combination of the two. System memory 504 typically includes an operating system 506 suitable for controlling the operation of a networked personal computer, such as the WINDOWS® operating systems from Microsoft Corporation of Redmond, Wash. or a server, such as Windows SharePoint Server 2007, also from Microsoft Corporation. The system memory 504 may also include one or more software applications 508 and may include program data.

The computing device 106 may have additional features or functionality. For example, the computing device 106 may also include additional data storage devices (removable and/or non-removable) such as, for example, magnetic disks, optical disks, or tape. Such additional storage is illustrated in FIG. 5 by removable storage 510 and non-removable storage 512. Computer storage media may include volatile and non-volatile, removable and non-removable media implemented in any method or technology for storage of information, such as computer readable instructions, data structures, program modules, or other data. System memory 504, removable storage 510 and non-removable storage 512 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 106. Any such computer storage media may be part of device 106. Computing device 106 may also have input device(s) 514 such as keyboard, mouse, pen, voice input device, touch input device, etc. Output device(s) 516 such as a display, speakers, printer, etc. may also be included. These devices are well known in the art and need not be discussed at length here.

The computing device 106 may also contain communication connections 518 that allow the device to communicate with other computing devices 520, such as over a network in a distributed computing environment, for example, an intranet or the Internet. Communication connection 518 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The various embodiments described above are provided by way of illustration only and should not be construed to limiting. Various modifications and changes that may be made to the embodiments described above without departing from the true spirit and scope of the disclosure.

What is claimed is:

1. A method implemented on a first server computer for synchronizing project task information between the first server computer and a second server computer, the method comprising:
    publishing a project on the first server computer, the first server computer implementing a project management software program, the project comprising one or more tasks, each of the one or more tasks including one or more attributes;
    mapping attributes for at least one of the one or more project tasks to corresponding task attributes used on a mail server program on the second server computer, the task attributes used on the mail server program being a subset of the project task attributes;
    sending task data for one or more project tasks from the first server computer to the second server computer, the task data including the mapped attributes for the one of the project tasks, the task data being sent to the second server computer using web services;
    receiving a notification from the second server computer that a project task has been updated on the second server computer;
    after receiving a notification from the second server computer that a project task has been updated on the second server computer, sending a request to the second server computer for the task attributes of the project task that has been updated on the second server computer;
    after sending a request to the second server computer for the task attributes of the project task that has been updated, receiving the task attributes of the project task that has been updated from the second server computer;
    after receiving the task attributes of the project task that has been updated from the second server computer, determining whether the received task attributes of the project task are newer than task attributes for the project task stored on the first server computer;
    when a determination is made that the received task attributes for the project task are newer than the task attributes for the project task stored on the first server computer, replacing the task attributes of the project task stored on the first server computer with the received task attributes;
    updating the project task on the first server computer via a task status update on the first server computer; and
    mapping one or more attributes for the project task updated via the task status update to corresponding task attributes on the mail server program on the second server computer.

2. The method of claim 1, wherein sending the mapped task attributes for at least one of the one or more project tasks to the second server computer further comprises sending a registration request to the second server computer to register the at least one of the one or more project tasks at the second server computer.

3. The method of claim 1, further comprising sending task assignment information from the first server computer to the second server computer.

4. The method of claim 3, wherein the task assignment information includes an identifier for the task and a resource assigned to the task.

5. The method of claim 1, wherein determining whether the received task attributes of the project task are newer than task attributes for the project task stored on the first server computer comprises comparing a timestamp for the received task attributes with a timestamp for the project task stored on the first server computer.

6. The method of claim 1, wherein sending a request to the second server computer for the task attributes of the project task that has been updated on the second server computer further comprises using web services to send the request to the second server computer.

7. The method of claim 1, wherein the task attributes used on the mail server program includes an attribute indicating percent complete.

8. The method of claim 1, further comprising the task status update being received over the Internet from a client computer.

9. The method of claim 1, wherein updating a project task further comprises updating one or more attributes for the task on the first server computer.

10. The method of claim 1, further comprising sending the one or more mapped attributes to the second server computer.

11. The method of claim 1, further comprising storing a timestamp for the updated project task on the first server computer.

12. A computing device, comprising:
    a processing unit;
    a system memory connected to the processing unit, the system memory comprising instructions that, when executed by the processing unit, cause the processing unit to create:
    a publishing module that processes the publishing of one or more tasks associated with a project, each task having one or more attributes;
    a status module that processes updates to the one or more attributes for the one or more tasks;
    a mapping module that maps one or more attributes for the one or more tasks to corresponding task attributes used on an email program, the attributes used on the email program being a subset of the attributes for each of the one or more tasks; and
    a mailbox module that processes a notification from a server computer that a task that has been updated on the server computer and that initiates a process to obtain task attributes from the server computer for the task that is updated, the process using web services to obtain the task attributes,
    wherein, the mapping module maps one or more of the obtained task attributes to corresponding task attributes on the email program.

13. The computing device of claim 12, wherein the processing unit further creates a project web access module that provides Internet access to the computing device.

14. The computing device of claim 13, wherein the project web access module includes a project server interface forwarder module that provides an interface to the computing device for project management system on a client computer.

15. The computing device of claim 12, wherein the processing unit further creates a job queue that receives queue jobs from the publishing module and from the statusing module, the queue jobs providing information to create and update project tasks on a mailbox server.

16. The computing device of claim 12, wherein the processing module and the statusing module include one or more task objects, each task object including a timestamp that indicates when the task object was last updated.

17. A computer-readable data storage medium, not being a signal, and having computer executable instructions stored thereon which, when executed by a processing unit of a first server computer, cause the processing unit to:
- publish a project on the first server computer, the first server computer implementing a project management software program, the project comprising one or more tasks, each of the one or more tasks including one or more attributes;
- map attributes for at least one of the one or more project tasks to corresponding task attributes used on a mail server program on the second server computer, the task attributes used on the mail server program being a subset of the project task attributes;
- send task data for one or more project tasks from the first server computer to the second server computer, the mapped task attributes being sent to the second server computer using methods exposed by an application programming interface on the second server computer, the task data including the mapped task attributes for the one of the project tasks, the task data being sent to the second server computer using web services;
- receive a notification from the second server computer that a project task has been updated on the second server computer;
- after receiving a notification from the second server computer that a project task has been updated on the second server computer, send a request to the second server computer for the task attributes of the project task that has been updated on the second server computer;
- after sending a request to the second server computer for the task attributes of the project task that has been updated, receive the task attributes of the project task that has been updated from the second server computer;
- after receiving the task attributes of the project task that has been updated from the second server computer, determine whether the received task attributes of the project task are newer than task attributes for the project task stored on the first server computer, the determination of whether the received task attributes of the project task are newer than task attributes of the project task stored on the first server computer including comparing a timestamp for the received task attributes with a timestamp of the attributes of the project task stored on the first server computer;
- when it is determined that the received task attributes for the project task are newer than the task attributes for the project task stored on the first server computer, replace the task attributes of the project task stored on the first server computer with the received task attributes;
- update status for a task, the updating of task status comprising modifying one or more attributes for the task, the updating of task status being received via a project web access portal on the computing device;
- map one or more attributes for the task to corresponding task attributes used on a mail server program on a mailbox server; and
- using web services to send the one or more mapped attributes for the task to the mailbox server.

* * * * *